Nov. 24, 1942.        M. STERN        2,302,981
METHOD FOR THE MANUFACTURE OF ALUMINUM TO BE USED
FOR ALUMINO-THERMIC PURPOSES
Filed March 3, 1942
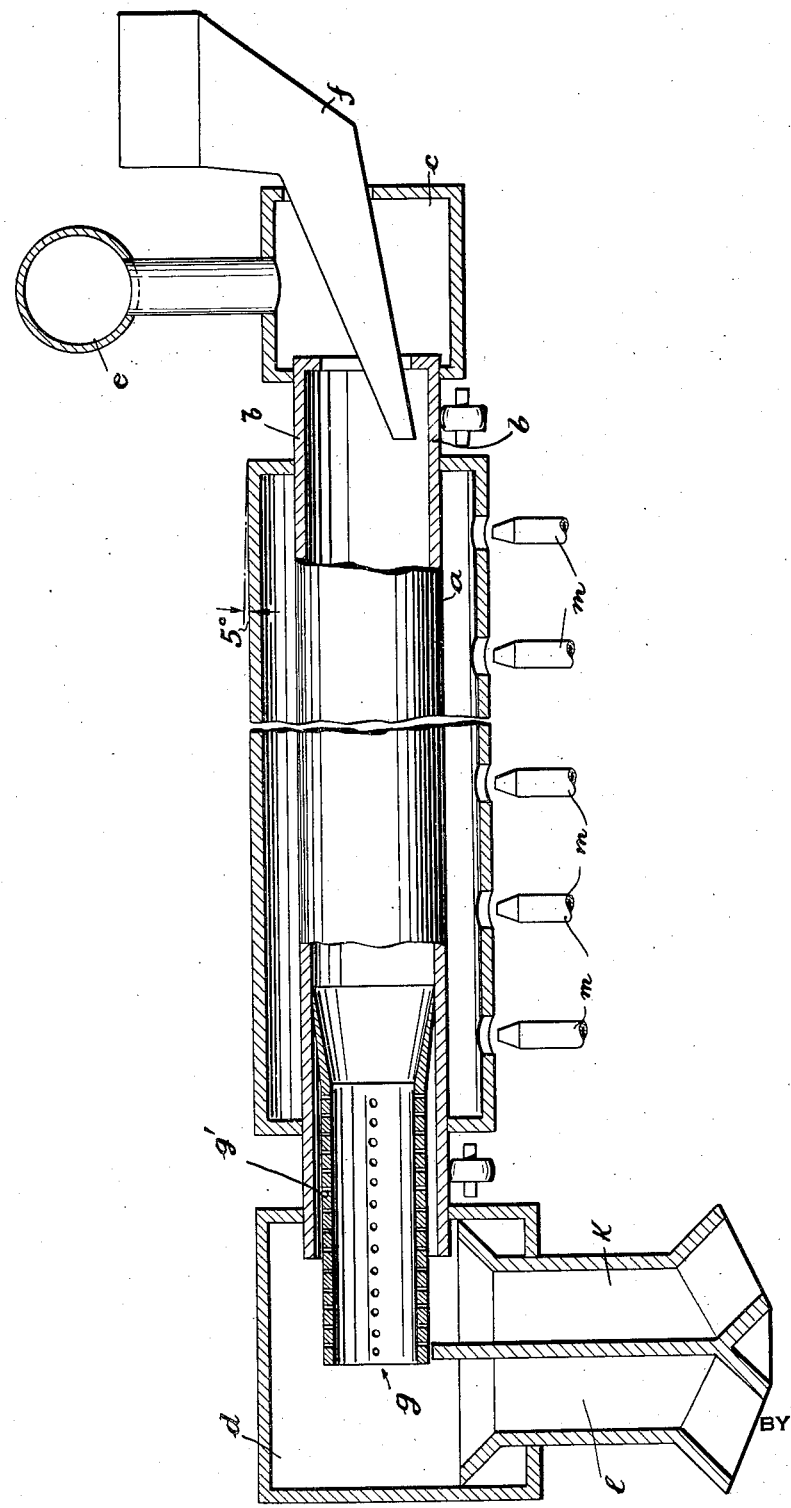
INVENTOR:
Max Stern
BY
ATTORNEY Patented Nov. 24, 1942

2,302,981

UNITED STATES PATENT OFFICE 2,302,981

METHOD FOR THE MANUFACTURE OF ALUMINUM TO BE USED FOR ALUMINO-THERMIC PURPOSES

Max Stern, Kew Gardens, N. Y.

Application March 3, 1942, Serial No. 433,188

2 Claims. (Cl. 75—0.5)

The invention relates to a method for the manufacture of aluminum to be used for alumino-thermic purposes.

The metal, therefore, must be in a more or less comminuted form or consist of particles of a small size. This type of aluminum may for clarity's sake be referred to as "thermite aluminum" in the course of this specification.

Many methods for the production of this kind of aluminum are known.

According to these known methods, for instance, a molten bath of aluminum is cast into granules or the molten metal is poured into a cylindrical press provided with a perforated bottom and pressed through the apertures of this bottom or the aluminum is mechanically comminuted.

If the aluminum is used for the production of general thermite mixtures a disintegration to the size of 20-20 mesh/sq. inches is required, whereas for the production of ferro alloys or pure metals such as chromium, vanadium, molybdenum and titanium by alumino-thermic reduction a coarser product is desired.

It is the object of this invention to produce thermite aluminum directly from aluminum scrap such as borings, turnings, chippings and grindings.

It is a further object of the invention to entirely obviate in the production of thermite aluminum the customary remelting procedure and to thereby avoid melting losses which vary between 6 to 20%.

It is also an important object of the invention to avoid the excessive costs and drawbacks of mechanical comminution leading to strongly contaminated products.

It is a further object of the invention to avoid losses of time and difficulties involved in the remelting of fine aluminum scrap.

It is also an object of the invention to recover practically 100% of the metal contents of the scrap for the conversion of the same into thermite aluminum.

With these objects in view the invention in its broadest aspect comprises the following process steps.

Contaminated aluminum scrap such as turnings, chippings, borings and grindings containing a comparatively high percentage of up to 25% organic matter, for instance oil, water and other impurities are firstly cleaned and liberated from the contaminations. This may be advantageously achieved by keeping the scrap in motion and heating the same simultaneously to a temperature of about 200-250° C.

As soon as the impurities are removed and the scrap is dry, the temperature is raised to about 450-600° C. By the combined influence of the mechanical movement and this temperature the scrap changes its mechanical status entirely and becomes brittle to such an extent that it freely decomposes into small fragments of a varying size. The decomposed fragments are separated in order to obtain particles of the desired size; the thus obtained product is now ready for use. The coarser portion is returned into the process.

A device for carrying out the invention in the form of a rotary furnace is shown in the attached drawing.

The rotary furnace consists of a preferably cast-iron cylinder $a$ which is supported at an inclination of about 5° to assure the gradual transport of the charge through the furnace. The cylinder is surrounded by a heating jacket $b$ which is heated by burners $m$. The feed end as well as the discharge end of the rotary kiln $a$ are encased in furnace heads $c$ and $d$; the combustion gases escape into chimney $e$.

The aluminum scrap charge is introduced through hopper $f$ into the feed portion of the kiln; a perforated cylinder $g$ is mounted within the discharge section of the same. Separate discharge hoppers $k$, $l$ are provided for cylinder $a$ and for cylinder $g$. By a suitable regulation of the burners $m$ a temperature of approximately 200 to 250° C. is maintained in the first part and a temperature of about 450-600° C. is maintained in the discharge part of the furnace.

The contaminated aluminum chippings, turnings, borings or grindings are fed into the rotating furnace $a$ from hopper $f$. The scrap is conveyed into the first section of the furnace and heated to about 200-250° C. The organic matter, oil and the water are completely removed. The cleaned and dried scrap is then slowly conducted into the zone of the furnace which is maintained at a temperature of about 450-600° C. By the combined influence of the motion imparted to the scrap through the rotation of the furnace and the specific temperature the deoiled and dried scrap undergoes a surprising change of its mechanical status. It becomes highly fragile and brittle and decomposes freely into fine fragments of a varying size.

By the control of the speed of rotation the size of the fragments can be regulated insofar as the percentage of finer fragments may be increased with an increase of the speed of rotation.

The finely comminuted material is then conveyed into cylinder g which is provided with a perforated wall g' acting as a separating screen. This cylinder is exchangeable. The perforations are chosen in accordance with the desired size of the final product. The major portion of the treated material in the desired size falls into hopper k and is ready for use. The residual coarse portion is discharged into hopper f and returned to the feed for renewed treatment.

I claim:

1. Method for the manufacture of aluminum to be used for alumini-thermic purposes comprising transporting aluminum scrap successively through a zone heated to a temperature of about 200 to 250° C. and then through a zone heated to about 450–600° C. keeping the scrap during its passage through the said zones in continuous motion, removing from the scrap in the first zone the impurities, producing in the second zone within the scrap a state of extreme brittleness, decomposing the scrap hereby into fragments of a different size and separating from the same particles of a desired size.

2. Method for the manufacture of thermite aluminum comprising transporting aluminum scrap successively through a zone heated to a temperature of about 200 to 250° and through a zone heated to about 450–600° C., keeping the scrap during its passage through the said zones in continuous motion, removing from the scrap in the first zone the impurities, producing in the second zone within the scrap a state of extreme brittleness, decomposing the scrap hereby into fragments of a different size, separating from the same particles of a desired size and returning the coarse particles for renewed treatment.

MAX STERN.